UNITED STATES PATENT OFFICE.

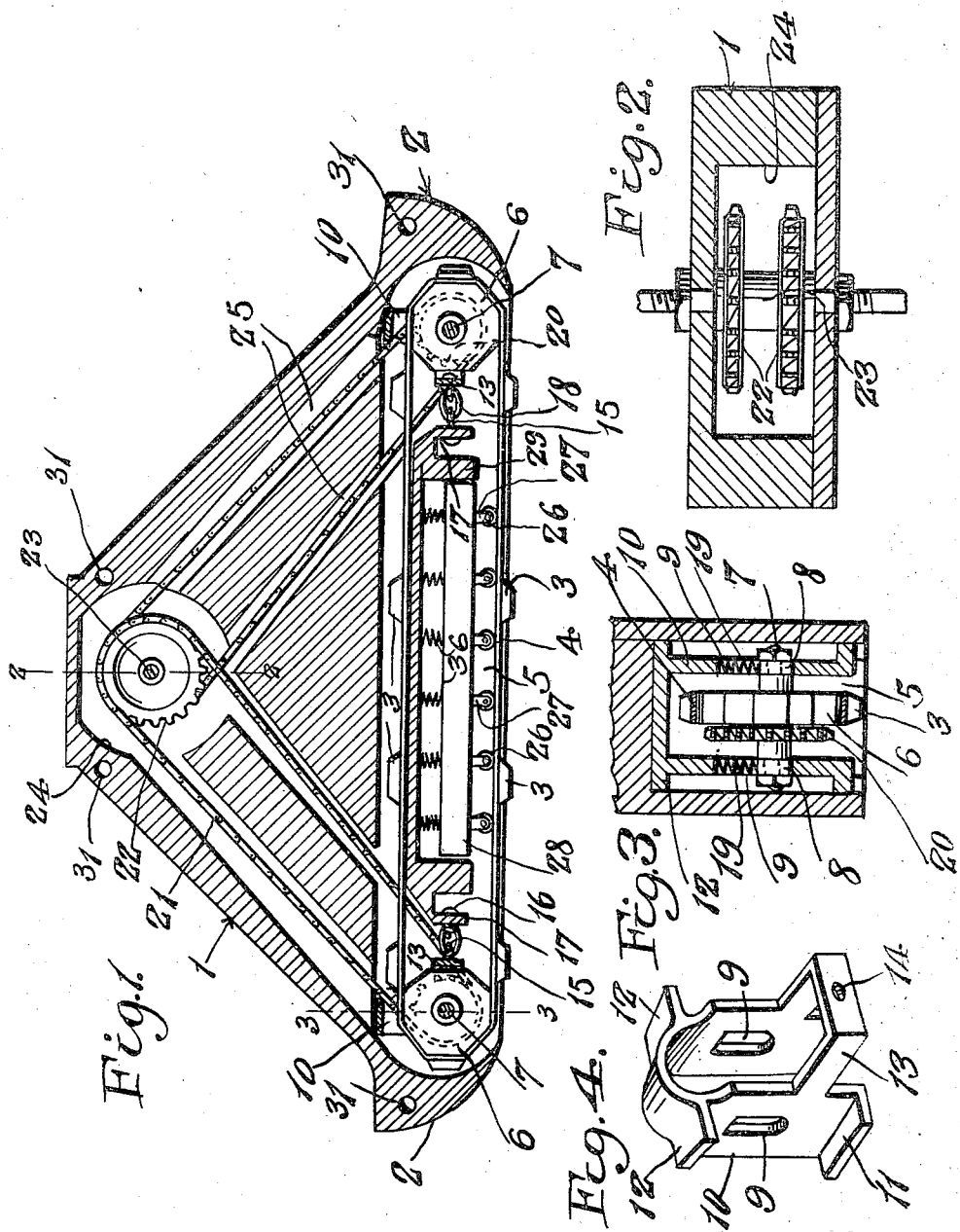

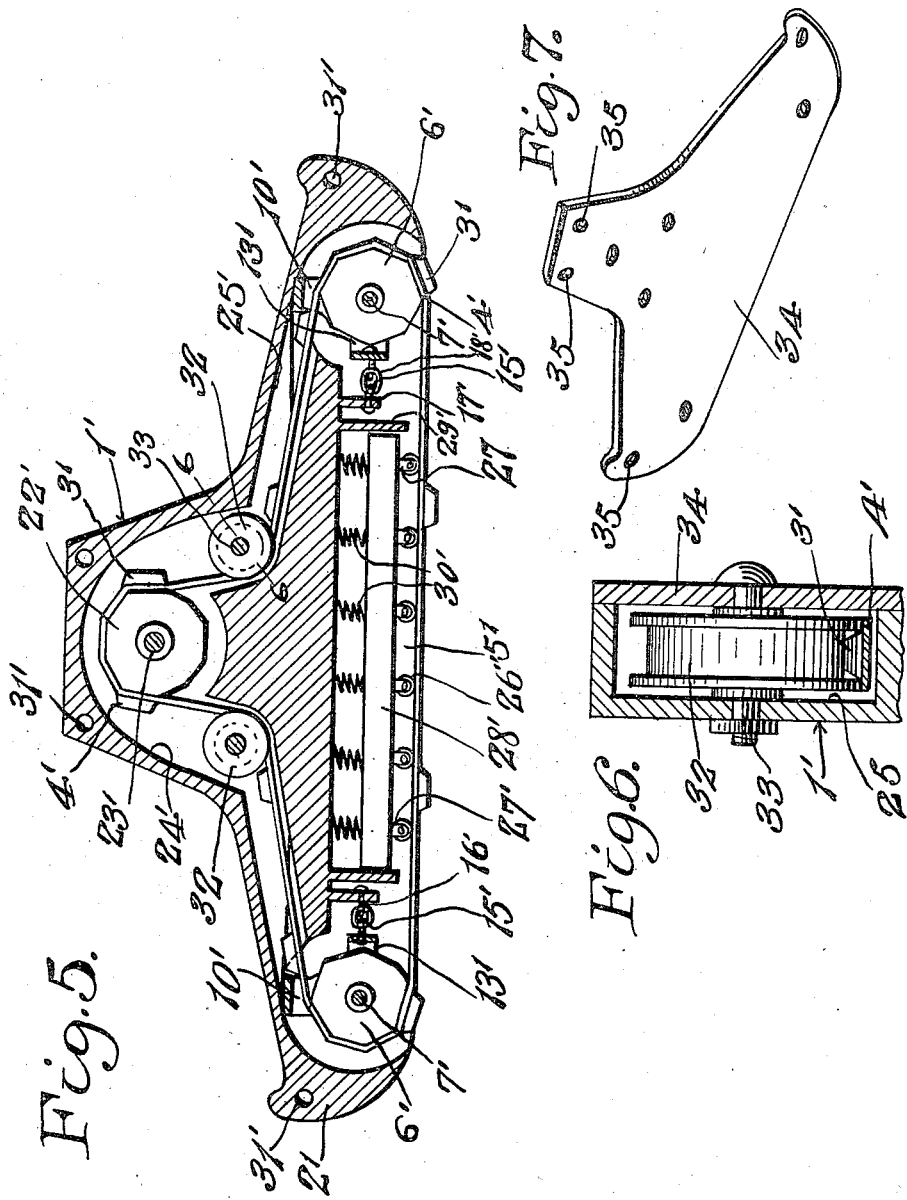

CARL ERIK ANDERSSON, OF DULUTH, MINNESOTA, ASSIGNOR OF FORTY-FIVE ONE-HUNDREDTHS TO DANIEL W. CUSICK, JR., OF DULUTH, MINNESOTA.

AUTOMOBILE SLEIGH-RUNNER.

1,124,384.   Specification of Letters Patent.   Patented Jan. 12, 1915.

Application filed May 28, 1914. Serial No. 841,501.

*To all whom it may concern:*

Be it known that I, CARL ERIK ANDERSSON, a citizen of the United States, residing at Duluth, in the county of St. Louis and State of Minnesota, have invented certain new and useful Improvements in Automobile Sleigh-Runners, of which the following is a specification.

This invention comprehends certain new and useful improvements in sleigh runners and has for its primary object to provide a device of this character which may be readily positioned upon an automobile or the like and which will be highly efficient in use.

Another object is to provide an automobile sleigh runner including a movable surface engaging member projecting through the bottom of the runner base, and provided with teeth for engagement in the surface over which the runner is traveling.

Another object is to provide a device of this character which will be constructed in such manner that the continuous surface engaging member may be operated from the engine of the vehicle upon which the runner is positioned.

A further object is to provide a sleigh runner of this character including means for resiliently retaining the teeth of the surface engaging member in engagement with the surface and also serving to absorb all shocks incident to said teeth coming in contact with stones or other obstructions in the path of the runner.

A further object of the invention is to provide a sleigh runner of this character which will be constructed in such manner that the movable continuous surface engaging member will be engaged around a pair of sprocket wheels mounted in such manner that they may be resiliently retained against vertical movement and the casing within which the shafts for said wheels are mounted may be readily moved toward or away from one another to adjust the tension of the continuous surface engaging member.

This invention has for a still further object to generally improve and simplify the construction and arrangement of the various parts of the device and the manner in which said parts are mounted and connected with one another and inclosed in a casing having a removable side plate, whereby said parts may be readily assembled or taken apart should it be necessary to replace any of the parts of the device on account of the same becoming worn or broken.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which—

Figure 1 is a longitudinal section through a sleigh runner constructed in accordance with my invention, Fig. 2 is a detail transverse section on the line 2—2 of Fig. 1, Fig. 3 is a detail transverse section taken on the plane of line 3—3 of Fig. 1, Fig. 4 is a detail perspective view of one of the bearing casings, Fig. 5 is a longitudinal section through a modified form of runner, Fig. 6 is a detail sectional view on the line 6—6 of Fig. 5, and Fig. 7 is a reduced perspective view of the removable side plates employed in the modified form of the device.

Referring in detail to the drawings by numerals, 1 designates an outer casing which is substantially triangular form in general outline, the lower wall of said casing serving as the base of the runner and having its opposite ends curved upwardly, as shown at 2, the base being open at its bottom to allow the surface engaging teeth 3 formed on the continuous lower belt 4 to project through the base of the runner and engage the surface over which said runner is traveling, to force the runner forwardly, thereby providing a self-propelling runner. The continuous belt 4 is positioned in the lower compartment 5 of the runner casing 1 and engaged around the sprocket wheels 6 at the opposite ends of said lower compartment 5. The sprocket wheels 6 are mounted upon the lower shaft 7 which have their opposite ends mounted in suitable bearings 8 engaged in the slots 9 formed in the side walls of the removable bearing casing 10.

The bearing casing 10 is of substantially U-shaped form and has its lower ends 11 directed outwardly, while flanges 12 are formed near the upper end of the casing 10, substantially parallel with the ends 11 and adapted for coöperation therewith to space the casing 10 from the opposite sides of the main casing 1 and guide said bearing casing in its longitudinal movement in the compartment 5. Each bearing casing 10 also has a handle 13 projecting therefrom, the opposite end of said handle being connected with the inner vertical edges of the sides of said bearing casing 10, and the central portion of said handle 13 being provided with a suitable opening 14 within which is secured a stationary screw 15 in alinement with a similar screw 16, which is secured in a depending ear 17 in the compartment 5 a spaced distance from the end thereof, said screws 15 and 16 being connected by a turnbuckle 18 by means of which the casing 10 may be moved longitudinally of the compartment 5 to adjust the tension of the continuous belt 4. It will be readily understood that the bearing casings 10 do not move vertically, but the shaft 7 and bearings 8 may move in the slots 9, and said bearings 8 are resiliently retained in the lower ends of said slots 9 by the springs 19 positioned in said slots 9. The shaft 7 also has mounted thereon the sprocket wheels 20 around which are engaged the drive chains 21 which also pass around the sprocket wheels 22 mounted upon the sleeve 23 within the upper compartment 24 of the main casing 1 and within which an axle or drive shaft of the vehicle upon which the device is employed, may be engaged to rotate said sleeve 23 and sprocket wheel 22. It will be understood that suitable inclined fasteners 25 connect the upper compartment 24 with the opposite ends of the compartment 5.

In order to resiliently retain the continuous sprocket chain 4 in normal or operative position, to permit engagement of the teeth 3 with the surface, I have provided a plurality of anti-friction rollers 26 for engagement with the upper face of the lower portion of the sprocket chain 4 and mounted in suitable brackets 27 depending from the lower face of the bearing block 28 pivotally mounted in an auxiliary compartment 29 formed between the upper and lower portions of the sprocket chain 4 and resiliently retained in its lowermost position by a series of springs 36 bearing against the upper face of said block 28. It will be evident that the rollers 26 will reduce friction to the minimum and said rollers together with the block 28 may be readily forced upwardly against the tension of the springs 36 upon engagement of the teeth 3 in said block, with a stone or other obstruction in the path of the runner.

While the main casing 1 may be formed in any suitable manner, I prefer to form the same from a casting and leave one side open to be closed by a suitable side plate positioned by bolts or other suitable securing members passed therethrough and through the openings 31 in the lower corners and the upper portion of said main casing 1.

In Figs. 5 to 7 inclusive, I have shown a modified form of the device in which a single continuous belt 4' is employed and passed around an upper sprocket wheel 22' mounted upon the sleeve 23' positioned transversely through the upper portion of the main casing 1' and through the upper compartment 24' of said main casing 1'. It will be understood that the continuous sprocket chain 4' is also passed around the lower sprocket wheel 6' and has the teeth 3' formed thereon and adapted to extend through the open face of the runner and engage the surface over which said runner is traveling. In this modified form of the device, I have provided a pair of grooved idlers 32 a spaced distance from the sprocket wheel 22 and to opposite sides of the latter, and adapted to ride upon the continuous sprocket chain 4' to retain the same in proper engagement with the sprocket wheels 22' and 6', as will be readily understood, the teeth 3' working in the grooves of said idlers 32.

It will be understood that the idlers 32 are mounted on suitable shafts 33 positioned transversely in the side passages 25' of the main casing 1' connecting the upper compartment 24' with the lower compartment 5'. It will also be understood that the sleeve 23' is adapted to be engaged over and locked for rotation with an axle or shaft of a vehicle upon which the runner is to be employed, whereby the continuous sprocket chain 4' will be driven to propel the runner.

It will further be understood that the lower sprocket wheels 6' are mounted upon suitable shafts 7' positioned transversely at the opposite ends of the lower compartment 5' and mounted in suitable slots in the sides of the bearing casings 10' similar to the bearing casings 10 employed in the preferred form of the device, having handles 13' with threaded members 15' projecting therefrom and connected with similar threaded members 16' by means of turnbuckles 18', said threaded members 16' being mounted in suitable depending ears 17' projecting into the lower compartment 5'.

It will also be understood that a portion of the continuous sprocket chain 4' is resiliently retained in its lowermost position or operative position by means of a series of bearing rollers 26' mounted in suitable brackets 27' depending from the bottom of the vertically movable bearing block 28' mounted in the auxiliary compartment 29' above the lower compartment 5', and resiliently retained at the lower portion of said auxiliary compartment 29' by means of a series of springs 30' bearing upon the upper face of said bearing block 28'. It will be understood, however, that the bearing rollers 26' and bearing block 28' may be readily forced upwardly against the tension of the springs 30' upon engagement of one or more of the teeth 3' beneath said block 28' and rollers 26', with an obstruction in the path of the runner.

It will be readily apparent that in the modified form, as well as in the preferred form, the main casing 1' is preferably in the form of a casting having one side open and adapted to be closed by means of the side plates 34 having suitable openings 35 for securing members for registration with the openings 31' in the corners of the main casing 1', whereby the securing members may be readily engaged through the main casing 1' and the side plates 34. It will further be understood that the opposite ends of the runner are curved upwardly, as shown at 2'.

While the preferred forms of the device are shown and illustrated, it will be understood that minor changes in the details of construction and arrangement of parts may be made within the scope of the appended claims without departing from the spirit of my invention or sacrificing any of the advantages thereof.

What is claimed is:—

1. A device of the class described comprising a runner including a main casing having a lower compartment with its bottom open, a continuous member within said lower compartment, sprocket wheels within said lower compartment, said continuous member being engaged over said sprocket wheels, surface engaging teeth carried by said continuous member, shafts for said sprocket wheels, means for resiliently retaining the shafts in proper position, means for adjusting the tension of the continuous member, and means for rotating the sprocket wheels to drive said continuous member.

2. A device of the class described comprising a runner including a main casing having upper and lower compartments, a drive wheel positioned in said upper compartment, sprocket wheels positioned in the lower compartment, shafts for said sprocket wheels, connections between said drive wheel and said shafts to rotate the latter, a continuous toothed member within the lower compartment and engaged around said sprocket wheels, the bottom of said main casing being open, the teeth of the continuous toothed member being adapted to extend through the open bottom of said main casing and engage the surface over which the runner is traveling, and means for supporting the shafts in proper position.

3. A device of the class described comprising a runner including a main casing having upper and lower compartments, a drive wheel within said upper compartment, sprocket wheels within the lower compartment, the bottom of the lower compartment being open, a continuous member engaged around said sprocket wheels and adapted to be driven by the drive wheel in the upper compartment, teeth carried by said continuous member and projecting through the open bottom of the lower compartment, shafts for said sprocket wheels, movable bearings for said shafts, means within said movable bearings for resiliently retaining the shafts in normal position, and means for resiliently retaining the teeth of the continuous member in engagement with the surface over which the runner is traveling.

In testimony whereof I affix my signature in presence of two witnesses.

CARL ERIK ANDERSSON.

Witnesses:
 GEO. B. SYOSELIN,
 KATHERINE OLSON.